United States Patent

Hedgpeth, IV

[11] Patent Number: 5,876,479
[45] Date of Patent: Mar. 2, 1999

[54] COMPOSITION AND METHOD OF MANUFACTURING A LIQUID HUMIC ACID BASED SOIL ENHANCER

[76] Inventor: Joel Hedgpeth, IV, 723 Almond Dr., Clovis, Calif. 93612

[21] Appl. No.: 893,366

[22] Filed: Jul. 15, 1997

[51] Int. Cl.⁶ .............................. C05F 1/00; C05F 11/00
[52] U.S. Cl. ......................... 71/11; 71/15; 71/16; 71/17; 71/18; 71/23; 71/24
[58] Field of Search ................... 71/24, 15, 17, 71/18, 16, 11, 23

[56] References Cited

U.S. PATENT DOCUMENTS

| | | |
|---|---|---|
| 103,085 | 5/1870 | Ruggles . |
| 731,461 | 6/1903 | Jarecki . |
| 1,668,464 | 5/1928 | Pease . |
| 1,974,877 | 1/1934 | Schubert . |
| 2,117,087 | 5/1938 | Formhals . |
| 2,158,918 | 5/1939 | Townsend . |
| 2,317,991 | 5/1943 | Grether . |
| 3,398,186 | 8/1968 | Schwartz . |
| 4,459,149 | 7/1984 | Moran ........................ 71/24 |
| 4,846,870 | 7/1989 | Weltzien ...................... 71/24 |
| 5,034,045 | 7/1991 | Alexander ................... 71/24 |
| 5,201,930 | 4/1993 | Campbell .................... 71/23 |
| 5,240,490 | 8/1993 | Moore ......................... 71/17 |
| 5,354,350 | 10/1994 | Moore ......................... 71/24 |

FOREIGN PATENT DOCUMENTS

1807048 A1   4/1993   U.S.S.R. ..................... 71/24

*Primary Examiner*—Wayne Langel
*Assistant Examiner*—Melanie Wong
*Attorney, Agent, or Firm*—Tom Hamill, Jr.

[57] ABSTRACT

Manufacturing procedures and compositions for soil enhancers and the like are disclosed. A solution is formed from adding humate to water under constant agitation. Sodium Bicarbonate is added to the solution, resulting in a reaction allowing silica to precipitate out of the solution. The resulting solution is about 12% humic acid. Additional water is added to the solution along with a series of crude protein sources, including fish protein, blood extract, and feather meal. Following the addition of each protein source to the humic acid solution, citric acid is added to increase the protein solubility. Sarsaponins (Yucca extract) is then added to stabilize microbial activity. Additional water is added to the resulting mix, followed by the addition of sugar beet waste lime (calcium carbonate). The calcium carbonate brings the mixture to a pH of about the range of 6.8 to 7.2, which has been found to be encouraging for microbial activity. Seaweed is then added to the mix. Then, an additional amount of water is added to the mixture. The complete mixture is then aged for about 10 days to breakdown proteins, increase the microbial count and to solubilize the micro and macro nutrients. The solution is then applied to soil by spraying, injection, sprinkler or drip irrigation methods.

13 Claims, 1 Drawing Sheet

COMPOSITION AND METHOD OF MANUFACTURING A LIQUID HUMIC ACID BASED SOIL ENHANCER

BACKGROUND OF THE INVENTION

1. Field of the Invention

The present invention relates generally to the manufacture and composition of soil enhancers, and more particularly, to a liquid soil enhancer derived from humate especially adapted to effect a general improvement in soil and plant productivity.

2. Description of the Prior Art

Fertilizers, soil enhancers and agricultural nutrients including humic acid combined with other ingredients are known in the art.

U.S. Pat. No. 3,398,186 discloses extracting humic acid from humate by precipitation at concentrations of humate salts at 20% by weight compared to a maximum of 8% by simple extraction. The pH of the extracting solution may be regulated by adding sodium carbonate and by being kept free of any ions forming an insoluble salt of humic acid.

U.S. Pat. No. 2,317,991 discloses the formation of plant stimulants within humus material by the addition of protein materials such as blood, bran, casein, blood serum, buttermilk, and leather. Water is added to the humus material. The protein materials may be added before, during or after the fermentation of the humus material.

U.S. Pat. No. 2,158,918 discloses the digestion or fermentation of moss (humus producing) used for fertilizer. The digestion is caused by the action of anaerobic and aerobic thermophile bacteria. The fertilizer base includes hydrolyzing oils, fats, fish, and lime.

Thus, while the foregoing body of prior art indicates it to be well known to use humic acid in combination with other ingredients, the provision of a liquid soil enhancer including the ingredients of the instant invention has not been taught. Nor does the prior art contemplate a method of manufacture of the instant soil enhancer which combines the ingredients under agitation to produce the same. The differences between the instant invention and the prior art will be made apparent from the following description thereof. Other advantages of the present invention over the prior art also will be rendered evident.

SUMMARY OF THE INVENTION

To achieve the foregoing and other advantages, the present invention, briefly described, provides a method of manufacturing a soil enhancer as well as the soil enhancer composition itself. The soil enhancer is such that it will have both biological and chemical effects when applied to soil or other growing medium. The results of these processes includes increased stimulation of soil microorganisms, increased availability of plant nutrient, increased stimulation of plant metabolism, and a general improvement in soil and plant productivity.

The process may be described essentially as follows. Humic acid is extracted from carbonaceous shales and oxidized lignites commonly known as humate. The humate is mixed with water in a central mixing chamber. To the solution, a non-toxic alkali such as sodium bicarbonate is added. The sodium bicarbonate brings the pH of the solution up and permits silica and other unwanted solids to precipitate. The remaining solution contains concentrated humic acid. Humic acid is a colloid with a high cation exchange capacity. This increased mobility of molecules with positively charged ions increases the permeability of plant membranes which aids the nutrient uptake from growing medium to plant. Next, hydrolyzed proteins are added to the solution. These proteins include poultry feather meal, spray dried blood meal and fish bone meal. These proteins will be added to the solution one at a time. After each individual protein is added to the solution, citric acid will be introduced to the solution. The citric acid lowers the pH of the solution, which will permit the proteins to be solubilized. The protein molecules are broken down into amino acids through a process known as aminization. The amino acids are then further converted to ammonic nitrogen through a process known as ammonification. After the last portion of citric acid is added to the solution, additional water is added and the solution is homogenized through action of the agitation, sugar beet waste limestone is then added to the solution. Sugar beet waste limestone is a byproduct of sugar production. The primary component of sugar beet waste limestone is calcium carbonate. Then, extract of yucca plant is added to the solution. The yucca contains a concentration of saponin which aids in odor reduction. At this point, Ascrophyllum nodosum seaweed extract is then added to the continuously agitating solution. The seaweed extract contains over sixty naturally occurring major and minor nutrients, including amino acids, trace minerals, plant growth hormones (auxins, gibberellins, and cytokinins) as well as chelating or complexing agents (mannitol and algenic acid). Additional water is added at this time. The complete mixture is then aged for about 10 days to breakdown proteins, increase the microbial count and to solubilize the micro and macro nutrients. At this point, the solution is then filtered through a 100 mesh drum strainer. The finished product is a liquid concentrate, dark brown in color. The concentrate will be diluted with approx. 1 gallon of water to every ounce of concentrate. The water-concentrate mixture is then applied to soil by spraying, injection, sprinkler or drip irrigation methods.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will form the subject matter of the claims appended hereto.

In this respect, before explaining the preferred embodiment of the invention in detail, it is to be understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which this disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a liquid soil enhancer composed of a mixture of humic acid, a plurality of hydrolyzed protein sources, seaweed and limestone.

It is another object of the present invention to provide a liquid soil enhancer which naturally occurring ingredients and rates of application are designed to return to the soil a sustained level of productivity over the long term.

It is another object of the present invention to provide a liquid soil enhancer which includes seaweed as an active component.

It is another object of the present invention to provide a liquid soil enhancer which includes humic acid as a major component.

It is another object of the present invention to provide a liquid soil enhancer which includes hydrolyzed proteins, including, but not limited to poultry feather meal, dried blood meal, and fish bone meal, as major components.

It is another object of the present invention to provide a liquid soil enhancer which may be easily and efficiently manufactured and marketed.

An even further object of the present invention is to provide a liquid soil enhancer which is susceptible of a low cost of manufacture with regard to both materials and labor, and which accordingly is then susceptible of low prices of sale to the consuming public, thereby making such a liquid soil enhancer available to the buying public.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawings wherein.

DESCRIPTION OF THE PREFERRED EMBODIMENT

Figure 1:
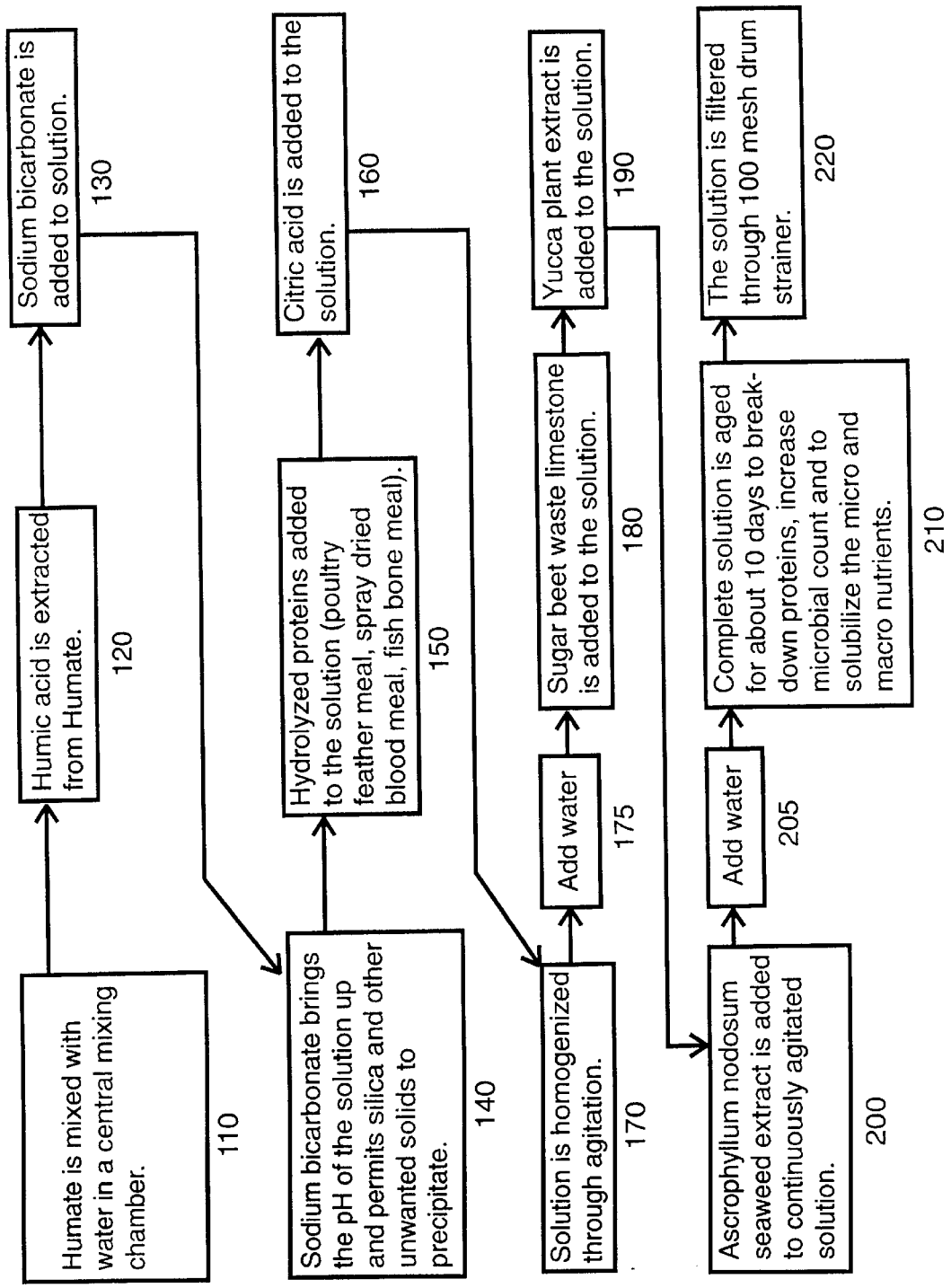
FIG. 1 is a flow chart diagraming the steps of manufacture of the liquid soil enhancer of the invention.

The liquid soil enhancer of the present invention includes several major groups of beneficent agricultural nutrients. The first group is seaweed, one of which may be chosen to be a soluble extract of Ascrophyllum nodosum. Ascrophyllum nodosum is a natural and organic storehouse of over 60 major and minor plant nutrients, amino acids, trace minerals, and plant growth hormones including auxins, gibberellins, and cytokinins, as well as chelating or complexing agents such as algenic acid and mannitol.

The second group is humic acid. Humic acid is extracted from carbonaceous shales and oxidized lignites commonly known as humate. Humic acid is a colloid with high cation exchange capability. Humic acid improves soil structure formation, aeration, water holding capacity, cell division, root growth, permeability of plant membranes which promotes the uptake of nutrients, germination capacity of seed, and growth of various groups of micro-organisms.

The third group is limestone. Limestone is comprised of calcium carbonate. Calcium carbonate acts as a buffer against acid formation in soil. Such acid formation is a common byproduct of nitrogen fertilizer use. Calcium carbonate also increases the availability of exchangeable calcium in the soil. Increase exchangeable calcium in the soil promotes the release of carbon dioxide, essential for photosynthesis to occur.

The fourth group is hydrolyzed proteins. In the instant invention this will include feather meal, blood meal and fish meal. These protein compounds are broken down into amino acids though aminization. These amino acids energize beneficial soil microorganisms. Amino acids are converted into ammonic nitrogen through ammonification.

Turning initially to FIG. 1, there is shown an exemplary embodiment of the steps taken to manufacture the liquid soil enhancer. The first step 110 is the mixing of humate with water in a paddle mixer. The second step 120 includes agitating the mixture thus forming a humic acid solution. The third step 130 includes adding sodium bicarbonate to the mixture. The fourth step 140 is continued agitation of the mixture, allowing the sodium bicarbonate to cause the pH of the solution to increase thus permitting silica and other unwanted solids to precipitate.

The fifth step 150 is the addition of hydrolyzed proteins to the mixture. Step six 160 includes the addition of citric acid to the mixture. The fifth step 150 and the sixth step 160 are repeated three times, once each for the feather meal, the blood meal and the fish meal. That is to say, after the feather meal is added, a first portion of citric acid is added. Then, the blood meal is added, followed by a second portion of citric acid. Finally, the fish meal is added, followed by a third portion of citric acid. As each component is added, the mixer continuously mixes the mixture. The citric acid permits the hydrolyzed proteins to be solubilized by lowering the pH of the mixture. Step seven 170 is the continued mixing which homogenizes the mixture. Additional water may be added at this time (step 175).

The eighth step 180 is the addition of sugar beet waste limestone to the mixture. Sugar beet waste limestone is a limestone source which is a waste product of sugar manufacture. This limestone contains calcium carbonate. The ninth step 190 is the addition of extract of yucca plant to the mixture. Yucca plant contains saponin which will help control the odor of the mixture. The tenth step 200 is the addition of seaweed to the mixture. The preferred seaweed is Ascrophyllum Nodosum. The seaweed extracts are completely homogenized. Additional water may be added at this time (step 205).

Step eleven 210 is the ageing step. The entire mixture is aged for about 10 days. This permit further breakdown of proteins, as well as increased microbial counts. Also, this permits the micro and macro nutrients to solubilize more completely. Step twelve 220 consists of straining the mixture through a 100 mesh drum strainer, removing unwanted solids and leaving a liquid concentrate which is dark brown in color. The liquid soil enhancer is then packaged and distributed to the end user.

Table 1 describes a general formulation of the ingredients employed in the manufacture of the liquid soil enhancer of the present invention.

TABLE 1

| Ingredient | Quantity |
|---|---|
| Water | 100 gallons (+/−) 50% |
| Humate | 200 lbs. (+/−) 30% |
| Sodium bicarbonate | 50 lbs. (+/−) 25% |
| Feather meal | 100 lbs. (+/−) 20% |

TABLE 1-continued

| Ingredient | Quantity |
| --- | --- |
| Citric acid | 10 lbs. (+/−) 50% |
| Blood meal | 50 lbs. (+/−) 50% |
| Citric acid | 10 lbs. (+/−) 50% |
| Fish meal | 50 lbs. (+/−) 50% |
| Citric acid | 10 lbs. (+/−) 50% |
| Water | 100 gallons (+/−) 20% |
| Limestone | 100 lbs. (+/−) 40% |
| Yucca extract | 6 gallons (+/−) 100% |
| Seaweed | 176 lbs. (+/−) 100% |
| Water | 100 gallons (+/−) 100% |

Table 1 presents the ingredients in the general order and relative amounts that would be added to a standard paddle mixer as described above. The (+/−) are included as different soils and plants may require different formulations, optimized to their particular specifications. The percent values in the above table are given by weight for those items given in weight (pounds) and by volume for those items given in volume (gallons). It should be noted that each constituent has it's particular range, for example, the water may be within the range of 50 to 150 gallons. It is hoped that the ranges included are sufficient to cover most cases. However, it should be noted that these ranges may be extended beyond the formulation presented in Table 1. It is to be understood that this is just one example of a formulation which may produce a product which is part of the invention in this case. Components of the formulation may be added in different orders (to an extent) and other ingredients may be added or substituted. For example, the limestone is provided by sugar beet waste limestone. Other limestone sources or calcium carbonate sources may be substituted if desired. Also, three hydrolyzed proteins, feather meal, blood meal and fish meal are part of Table 1. Other protein sources may be employed as well if desired. The same is true for the seaweed. In other words, there are other sources of the components of the "recipe" than those entered in Table 1 above and in this specification. Those "other sources" are incorporated herein.

It is apparent from the above that the present invention accomplishes all of the objectives set forth by providing a new and improved liquid soil enhancer composed of a mixture of humic acid, a plurality of hydrolyzed protein sources, seaweed and limestone.

With respect to the above description, it should be realized that the optimum dimensional relationships for the parts of the invention, to include variations in size, materials, shape, form, function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiment of the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

What is claimed as being new and desired to be protected by Letters Patent of the United States is as follows:

1. A method of manufacturing a water soluble liquid soil enhancer and organism stimulant to be placed in the soil including the steps of:

a) mixing water and humate to form humic acid, b) then adding sodium bicarbonate to raise the pH and to precipitate any solids, c) next adding hydrolyzed proteins forming a mixture, d) then adding citric acid to solubilize said hydrolyzed proteins, e) next adding limestone, f) next adding seaweed, g) performing steps a–f while undergoing constant mixing, h) ageing the homogenized mixture for 10 days, which permits the growth of beneficial microbes while allowing the proteins to break down, i) filtering said mixture, removing particles in suspension, whereby a concentrated liquid organism stimulant and water soluble soil enhancer is provided, which includes beneficial nutrients as well as a population of microbes.

2. A method of manufacturing a liquid soil enhancer and organism stimulant to be placed in the soil as claimed in claim 1 wherein said hydrolyzed proteins are alternately added with said citric acid in steps c and d above in the following manner, h) first adding a first hydrolyzed protein, i) then adding a first portion of citric acid, j) then adding a second hydrolyzed protein, k) then adding a second portion of citric acid, l) then adding a third hydrolyzed protein, m) then adding a third portion of citric acid, n) performing steps h–m while undergoing constant mixing.

3. A method of manufacturing a liquid soil enhancer and organism stimulant as claimed in claim 1 wherein, said limestone includes sugar beet waste limestone.

4. A method of manufacturing a liquid soil enhancer and organism stimulant as claimed in claim 1 wherein, said seaweed includes Ascrophyllum nodosum seaweed extract.

5. A method of manufacturing a liquid soil enhancer and organism stimulant as claimed in claim 2 wherein, said first hydrolyzed protein and said second hydrolyzed protein and said third hydrolyzed protein may be selected from the group consisting of feather meal, blood meal and bone meal.

6. A method of manufacturing a liquid soil enhancer and organism stimulant as claimed in claim 1 wherein in step a, about 4 parts water to every 1 part humate, by weight, are combined.

7. A method of manufacturing a liquid soil enhancer and organism stimulant as claimed in claim 1 wherein in step e, about ½ part limestone by weight is added to the mixture.

8. A method of manufacturing a liquid soil enhancer and organism stimulant as claimed in claim 1 wherein in step c, about 1 part of hydrolyzed proteins by weight are added to the mixture.

9. A method of manufacturing a liquid soil enhancer and organism stimulant as claimed in claim 1 wherein in step d, less than 1 part of citric acid by weight is added to the mixture.

10. A method of manufacturing a liquid soil enhancer and organism stimulant as claimed in claim 1 wherein in step f, less than about 1 part of seaweed by weight is added to the mixture.

11. A liquid soil enhancer and organism stimulant being manufactured in accordance with the process of claim 1.

12. A liquid soil enhancer and organism stimulant formed from combining and mixing,
  a) about 300 gallons of water,
  b) about 200 pounds of humate,
  c) about 50 pounds of sodium bicarbonate,
  d) about 200 pounds of hydrolyzed proteins,
  e) about 30 pounds of citric acid,
  f) about 100 pounds of calcium carbonate, and
  g) about 180 pounds of seaweed.

13. A liquid soil enhancer and organism stimulant as claimed in claim 12 including,
  a) about 6 gallons of yucca plant extract.

* * * * *